March 17, 1931.  F. A. ROSS  1,796,624

FLEXIBLE SHAFT COUPLING

Filed Jan. 11, 1930

Witness.
H. T. McKnight

Inventor.
Frank A. Ross.
by Burton & Burton
his Attorneys.

Patented Mar. 17, 1931

1,796,624

UNITED STATES PATENT OFFICE

FRANK A. ROSS, OF WILMETTE, ILLINOIS, ASSIGNOR TO STEWART-WARNER CORPORATION, OF CHICAGO, ILLINOIS, A CORPORATION OF VIRGINIA

FLEXIBLE-SHAFT COUPLING

Application filed January 11, 1930. Serial No. 420,233.

The purpose of this invention is to provide an improved construction for connecting a flexible shaft to the apparatus served. It consists in the elements and features of construction shown and described as indicated in the claims.

Figure 1:
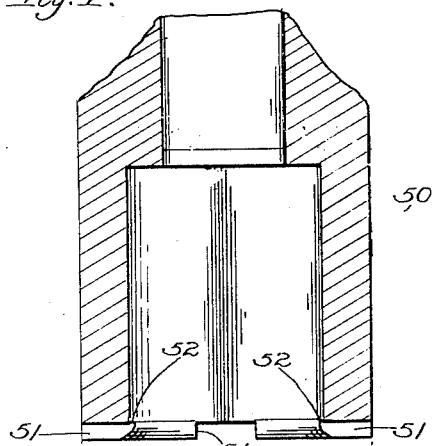
Figure 1 is a dissected view showing in axial section a socket and a flexible shaft and clip for holding it in the socket.
Figure 2:
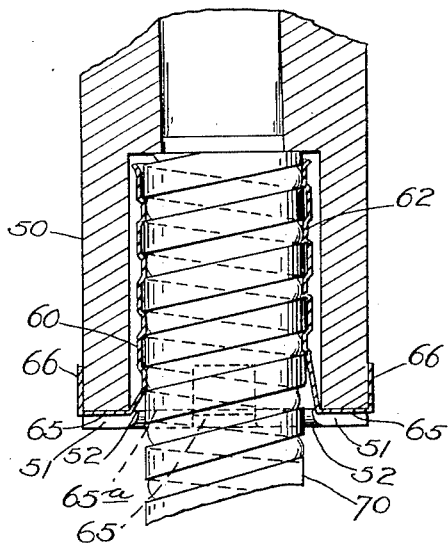
Figure 2 is a similar section showing the parts assembled.
Figure 3:
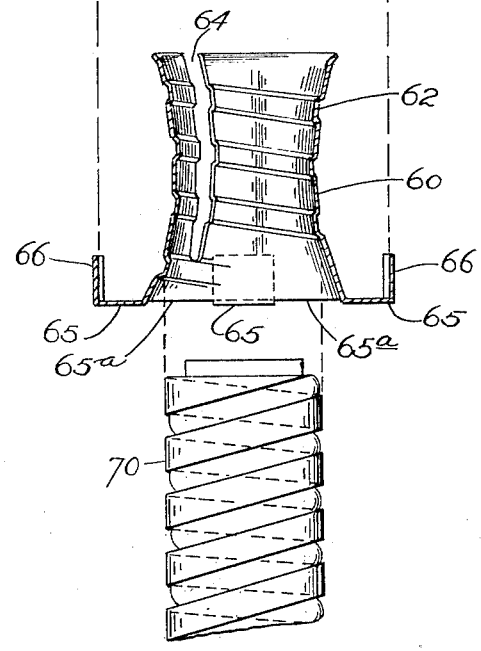
Figure 3 is an end view of the socket with the clip therein.
Figure 3:
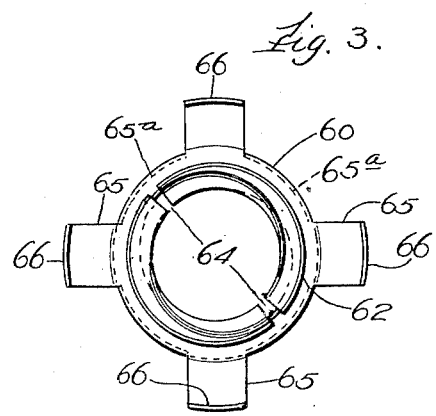

Referring to the drawings in detail the socket member, 50, which, it may be understood, is a terminal of the casing of the apparatus to which the shaft is to be connected, is notched at four points in the circumference of the open mouth of the socket as seen at 51; and between the notches the edge is peened over inwardly, forming slight inwardly projecting lips as seen at 52. There is provided a clip, 60, of sheet metal which may be described as a sleeve having an impressed screw thread, as seen at 62. This sleeve has at one end four out-turned lugs, 65, positioned for engaging the notches, 51, of the socket end and reflexed at the ends to clasp the end of the socket member, as seen at 66. The sleeve, 60, is diametrically rifted longitudinally as seen at 64, from a point near the end having the lugs, as illustrated, to said opposite end.

The screw thread formation of the sleeve is conformed to the helical form and diameter of the outwardly exposed helical casing member, 70, of the flexible shaft, which will be the outer helical element unless it is preferred in some cases to cut away three or four coils of the outer helix, exposing the inner helix for the engagement described with the screw thread of the clip. The sleeve, 60, beside having the screw thread formation, as described, is radially contracted over a portion of its length intermediate the ends, as seen in Figure 1, this contraction being effected by proper forming dies, preferably before rifting the sleeve as described.

The clip, 60, formed as described, is designed to be introduced into the socket in position for engaging the lugs, 65, in the notches, 51, the edge portions 65ª, between the lugs snapping into engagement with the peened over edge forming the inward projections, 52, so that the clip is held to the socket both against withdrawal and against rotation. When the flexible shaft casing is introduced into the clip, 60, the latter having already been inserted in the socket, the helical coils of the shaft casing engage the inwardly projecting thread, 62, of both halves of the sleeve; and upon any stress tending to pull this shaft out of the socket the engagement of the helical casing, 70, with the inner end portion of the two halves of the sleeve, while the clip, as a whole, is stopped endwise by engagement at the outer end with the peened over lips, 52, the longitudinal stress exerted on each half of the sleeve tends to flex them both inwardly at the radially contracted middle portion of their length, and enforce the engagement of the thread, 62, with the casing helix, at the same time that the engagement of the edges, 65ª, with the peened over lips, 52, is enforced; and thus any pull tending to withdraw the shaft from the clip enforces the engagement of the casing with the clip and of the clip with the socket.

It may be understood that the invention is not limited to diametrical splitting of the tubular clip, causing it to have only two wings or limbs; but, on the contrary, the number of rifts, and so the number of wings, limbs and fingers, may be as many as desired, limited only so that they shall not each be too slender for the purpose of enduring the pull to which the shaft is liable to be subjected in service.

It may be understood also that the invention is not limited to rifting the sleeve longitudinally to the end; but, on the contrary, the radial resiliency is made effective for gripping the shaft casing at the middle point of the contracted part, as described, under the condition of longitudinal compression due to pull, without extending the rifts to the end. Accordingly, in the claims, in the absence of express limitation, the reference to longitudinal rifting or splitting is not intended to indicate such rifting or splitting diametrically, to form only two limbs, nor to splitting entirely to the end.

I claim:—

1. Means for securing a flexible shaft in a socket comprising in combination with a helical casing member of the flexible shaft a clip adapted to be inserted in the socket, the socket and clip being cooperatively formed for engagement of the clip against withdrawal from the socket, said clip consisting of a longitudinally split sleeve having inwardly protruding projections for engaging the coils of the helical casing, the sleeve being radially contracted over a limited middle portion of its length, and said projections being located both at said middle contracted part and at the uncontracted end portion of both halves of the split sleeve.

2. Means for securing in a socket a flexible shaft having a helical casing, comprising in combination with a helical casing a clip adapted to be inserted in the socket, the socket and clip being cooperatively formed for engagement of the clip against ready withdrawal from the socket, said clip being tubular with an interior thread corresponding in pitch and diameter substantially to the helical casing of the flexible shaft, and being radially resilient and radially contracted at a limited middle portion of its length, and being longitudinally rifted over the radially contracted part for accommodating the radial resiliency and adapting the clip to admit the helical shaft casing longitudinally into the clip and to snap the interior thread of the clip into engagement with the helical casing.

3. In the construction defined in claim 1, the socket and clip having cooperating features for engagement against relative rotation when the clip is inserted longitudinally in the socket.

4. In the construction defined in claim 1, the socket having the entrance end notched, and a clip having outwardly turned lugs arranged for engaging the notches when the clip is inserted longitudinally into the socket to the position for engagement against withdrawal, as set forth in claim 1.

5. The construction defined in claim 1, the radial reduction of the sleeve at the intermediate part of its length increasing gradually from the opposite ends toward the middle part of said reduction; whereby endwise compression of the sleeve under pull against the means preventing withdrawal tends to contract the sleeve diametrically at the middle part.

In testimony whereof, I have hereunto set my hand at Chicago, Illinois, this 7th day of January, 1930.

FRANK A. ROSS.